Nov. 6, 1928.
T. S. CURTIS
1,690,771
MAGNESIA PRODUCT AND PROCESS OF MAKING THE SAME
Filed April 7, 1925
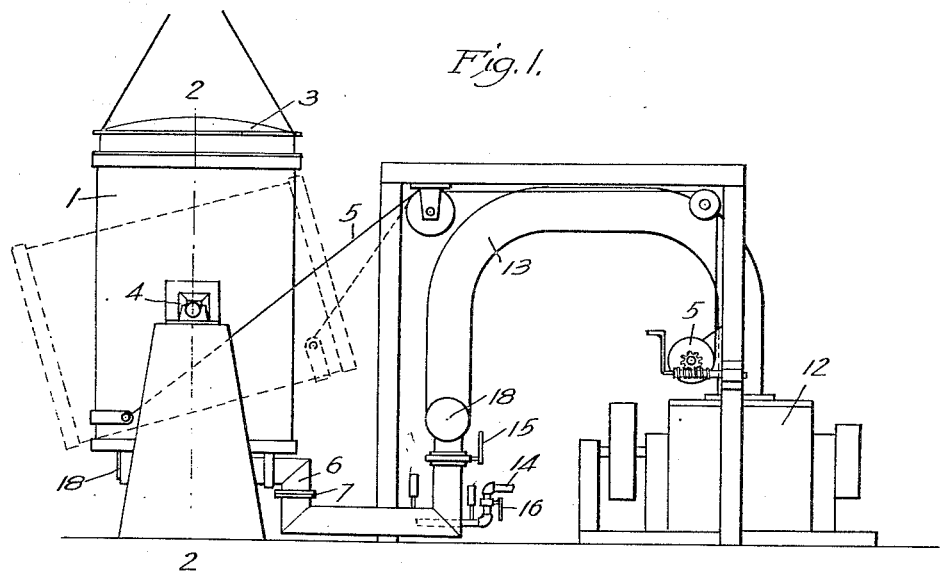
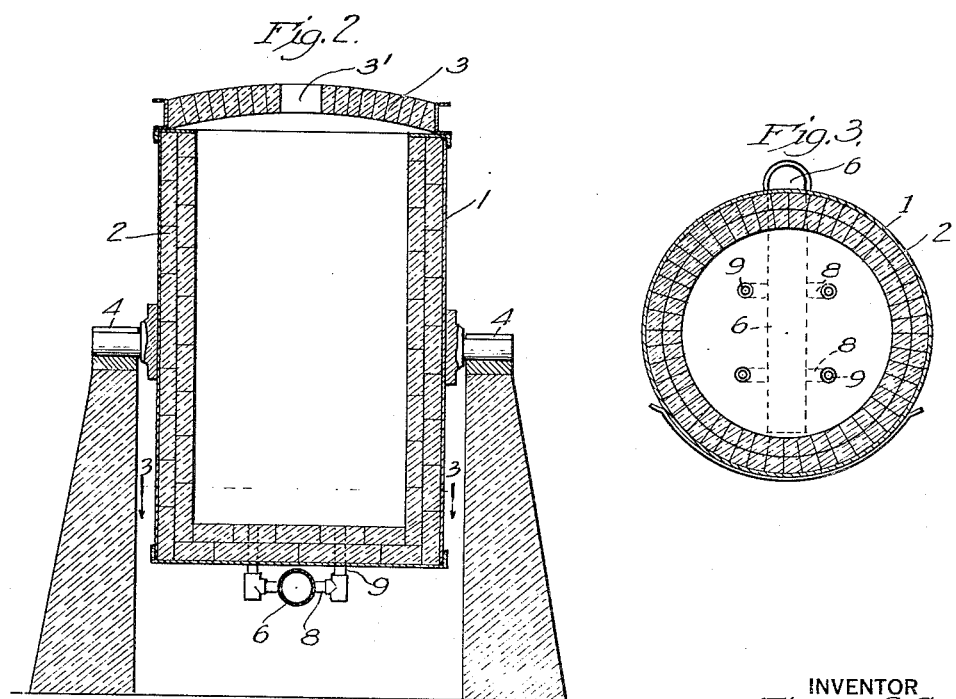
INVENTOR
Thomas S. Curtis
BY Arthur P. Knight
ATTORNEY Patented Nov. 6, 1928.

1,690,771

UNITED STATES PATENT OFFICE.

THOMAS S. CURTIS, OF HUNTINGTON PARK, CALIFORNIA, ASSIGNOR, BY MESNE ASSIGNMENTS, TO PACIFIC-SOUTHWEST TRUST & SAVINGS BANK, TRUSTEE, OF LOS ANGELES, CALIFORNIA, A CORPORATION OF CALIFORNIA.

MAGNESIA PRODUCT AND PROCESS OF MAKING THE SAME.

Application filed April 7, 1925. Serial No. 21,348.

This invention relates to the production of magnesia in the form of periclase and the chief object of the invention is to produce such form of magnesia of an especially high degree of purity and having novel and advantageous properties resulting from such purity and from the method by which it is made.

The conversion of magnesia to the crystalline form of periclase requires very high temperature and heretofore such temperature has been obtained for this purpose in commercial practice only in the electric furnace. The production of periclase in the electric furnace however is attended with many disadvantages, for example in regard to the purity of the product since periclase produced in this manner invariably contains certain impurities, the introduction of which into the product can not be avoided in an electric furnace and the presence of which seriously impairs the value of the product for certain uses. The impurities thus introduced in the electric furnace treatment and which are disadvantageous include carbon from the electrodes, iron from the metal walls of the furnace, and compounds formed between such carbon and iron and other impurities naturally occurring in the magnesia from which the periclase is made. An example of this latter class of impurities is calcium carbide, formed by reaction between traces of lime existing in the magnesia and the carbon of the electrodes.

These impurities render the product hygroscopic, causing it to absorb or take up considerable quantities of water so that the powdered material cakes or forms lumps and hence becomes unsuited for certain uses. These impurities also increase the electrical conductivity of the material and hence seriously interfere with its use as an electrical insulator. Furthermore the impurities not only increase the electrical conductivity directly by their presence, but the increased amount of water which their presence causes to be absorbed by the material still further increases the electrical conductivity.

The periclase produced according to my invention and having the properties hereinafter stated is free from these objectionable impurities and is therefore substantially non-hygroscopic and has a very low electrical conductivity. When powdered it will not cake together even in wet weather and in such form it is very well adapted for use as an electrical insulator.

A further object of the invention is to produce periclase in a more finely crystalline condition than it has heretofore been produced, thereby facilitating the reduction or grinding of the product to the desired degree of fineness for use.

A further object of the invention is to produce periclase by heating magnesia to a temperature below the fusion point thereof, so as to obtain the above-mentioned advantages of finer crystals, etc., and to also obtain a product which is of a distinctly granular nature, as distinguished from the dense, stony nature of the periclase heretofore produced.

The usual method of forming periclase, and in fact the method which has been used almost exclusively in the commercial production thereof, consists, as stated above, in heating a charge of magnesia to the fushion point, and then allowing the fused mass to cool and crystallize. By this method of procedure, relatively large crystals of periclase are obtained, and such crystals are all held together in a dense, almost vitreous mass which is very difficult to grind to proper size for use. Furthermore, by this method of production the small amounts of siliceous impurities which are present in the raw material, do not appear to form glass but apparently go into solid solution in the magnesium oxide due to the fushion thereof.

According to my method, which may be termed the "converter method" as distinguished from the above-described "electric furnace method" the magnesia is converted to the form of periclase without heating to the fusion point, and due to this fact the crystals which are produced are very much smaller and more uniform in size and are held together relatively loosely, with a considerable percentage of voids so that the product is of a distinctly granular character and is relatively easily ground or reduced to the desired size. Furthermore the siliceous impurities react with a portion of the magnesia to form a small amount of glass, probably chiefly magnesium silicate, which glass examination of the product shows to exist in the form of a thin coating on each periclase crystal or at least on a substantial proportion of such crystals. This glass coating on the individual grains, I believe to be of material advantage for the reason that it prevents or materially inhibits the absorption of moisture by the coated particles and thus prevents caking of the powdered material on standing and also maintains the electrical conductivity of the material at a very low figure.

The accompanying drawings illustrate an apparatus suitable for carrying out my heating process for the production of periclase and referring thereto:

Fig. 1 is a side elevation of such apparatus.

Fig. 2 is a vertical section through the converter, on line 2—2 in Fig. 1.

Fig. 3 is a horizontal section on line 3—3 in Fig. 2.

The converter or vessel in which the material is heated comprises preferably a vertical, cylindrical shell or casing 1 whose side and bottom walls are lined with suitable refractory or heat resistant material indicated at 2. The converter is open at its upper end to permit charging and emptying and is provided with a removable cover 3 constructed of or lined with refractory material for closing the upper end thereof during certain stages of the converter operation as hereinafter described, said cover having a suitable vent or opening 3'. Said converter is mounted to tilt in a vertical plane on horizontal axes or trunnions 4, suitable means indicated at 5 being provided for effecting such tilting operation. Supply means 6 are provided for mixing and supplying gas and air to the converter, said supply means having detachable connection 7 adapted to be disconnected so as to permit tilting of the converter. Said supply means 6 is connected by suitable branch pipes 8 to tuyères 9 extending through the bottom of the converter and adapted to supply or introduce gas and air into the converter. Suitable means are provided for producing a supply of air under pressure, such means comprising, for example, an air compresser or blower 12 connected by pipe 13 to the mixing and supply means 6. Gas supply means indicated at 14 are also provided for introducing into said supply means 6 the supply of the fuel gas. Said air and gas supply means 13 and 14 are provided with suitable valve means indicated at 15 and 16 respectively. Suitable means such as friction plugs or caps 18 may be provided at suitable points in the air supply pipe and in the fuel and air supply means 6 for preventing dangerous explosions, such plugs or caps being fitted comparatively loosely in place and adapted to be blown out in case of explosion, thus preventing damage to any parts of the apparatus.

My process of manufacture may be carried ous as follows: The raw material required is magnesite ore, preferably with a high magnesia content and as free as possible from impurities. In some cases pure magnesia may be used as raw material and in such cases no primary purification or calcining is necessary. In general however the ore as received is partly or largely in the form of magnesium carbonate or magnesite and contains more or less iron and other impurities. I therefore prefer to subject the ore to a primary calcining and purifying or grading operation.

This primary operation may consist in first washing the ore to remove therefrom any dirt and foreign matter adhering to the surface of the lumps or fragments of ore, then calcining to a bright red or orange heat to remove carbon dioxide and convert the magnesite to magnesia or magnesium oxide. This calcination serves a further purpose of converting particles or fragments of impurities, such as iron or iron oxide, to a form in which they may be more readily detected due to the distinctive color of such materials, the magnesia itself being of a white color. After the calcining operation I therefore prefer to subject the material to a rough hand sorting operation in which all slagged material as well as all black, brown or other colored pieces are removed. The white material passing through this sorting operation is then crushed to a suitable state of division, for example to approximately twenty mesh. The crushed material is then subjected to a further manual sorting operation in which all specked or discolored particles are removed. It will be understood that the above purifying or sorting operations are solely for the purpose of removing naturally occurring or other impurities from the material and do not constitute an essential part of my invention, except in that they provide a means for obtaining a magnesia of a sufficiently high purity from which the desired finished product may be produced.

The crushed magnesia free from impurities is then aggregated into lumps or fragments of suitable size for charging into the converter. For this purpose I prefer to puddle the pulverized material with water and form it into cakes or blocks of convenient size, for example approximately 50 pounds each. These cakes are then dried in any suitable manner for example by allowing them to stand in the air or by passing them on cars through a suitable dryer of any well-known type. In some cases the heat of hydration developed by the absorption of water by the magnesia may be sufficient to dry the cakes without application of further heat. The dried cakes are then broken or crushed to suitable size for example to fragments averaging from 2 to 4 inches across, this crushing being done either by hand or in any suitable crusher.

The fragments or aggregates so obtained are then charged into the converter until it is substantially full, the only precaution necessary during this charging operation being to insert rods or bars in the openings of the tuyères at the bottom of the converter at the start of the charging operation so as to prevent covering of such openings by any of the fragments of the material. The bars used for this purpose are removed as soon as the first portion of the charge is placed.

The converter operation may be divided into two principal stages. The first, which may be called the gas or ignition stage, consists in burning an explosive mixture of natural gas or other combustible carbon-bearing gas and air in the converter which in many respects is similar to a typical Bessemer converter as used in the steel industry. In starting the converter, gas is admitted through pipes 14 and 6, without air, and ignited at the top of the converter. As soon as free combustion is established the air valve 15 is opened until an explosive mixture is obtained which is immediately manifested by a mild explosion which extinguishes the free burning gas flame at the top of the converter and promotes the combustion without visible flame down inside the charge within the converter. The proportions of air and gas necessary for this combustion are readily calculated if the composition and B. t. u. value of the gas are known. In the case of a typical Southern California natural gas having a value of approximately 1150 B t. u. the proportions of gas to air for perfect combustion are as 1 to 10.7. In order to ensure sufficient deposition of carbon throughout the mass as hereinafter described, however, I prefer in general to use a mixture containing a slight excess of gas. For this purpose the ratio of gas to air may be maintained for example at 1 to 10. This desired mixture may be controlled for example by means of low pressure direct reading manometers 19 which read in ounces of pressure per square inch. Air is supplied by a positive pressure blower or other means 12 operating preferably at from 1½ to 2 pounds to the square inch. Gas is delivered to the furnace at a suitable pressure for example approximately 6 pounds per square inch ahead of the control valve. The actual gas pressure registering on the gauge beyond the control valve is maintained for example at six ounces above the air pressure. This relation is, of course, established by the size of the air supply pipe and the orifices through which the gas passes into the mixing chamber or supply pipe 6. The relation of these openings is purposely designed to maintain constantly a higher gas pressure than air pressure at the mixing point to prevent air passing back into the gas pipe line, and thus prevent danger of explosions in the gas line. The friction caps 18 above described serve to prevent serious damage in case of explosion within the mixing chamber 6. Such explosion hazards have however virtually been eliminated by reducing the size of the tuyères 9 and increasing the velocity of the explosive mixture until the velocity was found to be greater than the rate of flame propagation.

Once the combustion has been started the operation of the converter is characterized by extreme simplicity, the fact that combustion is taking place being manifested solely by a roaring sound from within the converter. Usually for the first two to three hours of the operation no flame whatever is visible in the converter, and usually after three hours a color appears at the top of the converter and a trace of yellow flame shows above the charge. After about four hours and from that time until near the end of the first stage of the operation, a slow but continuous settling of the charge is manifested. During the remainder of this gas period, as it is called a further charge of fragments of pure magnesia can be added to that originally placed in the converter, due to the settling of the charge brought about by the partial fusion or softening thereof and the reaction occurring therein. During all the above stages of the operation of the converter, the removable cover 3 is left off, leaving the upper end of the converter open. Usually after six to fourteen hours of operation the portable cover 3 is placed on the converter to complete the burning of the charge at the extreme top of the vessel. The balance of the gas period, which in total comprises from ten to twenty hours or longer, is then merely an operation of quiet combustion.

It will be seen that during the above described gas period an explosive mixture of gas and air is supplied to the bottom of the bed of fragmentary material in the converter and the combustion of this mixture takes place at the surfaces of such material. It is a well-known fact that the type of combustion thus produced which is known as surface combustion produces much higher temperatures than can be obtained when the gas and air mixture is burned in an open flame. The entire mass of fragmentary material is thus raised to a high temperature, this temperature being at or near that at which magnesia is converted to the form of periclase. I have found however that if the heating operation is stopped at the end of the gas period the conversion to periclase is incomplete and the product is discolored due to the presence of carbon throughout the fragments or lumps of material in the converter. This carbon is deposited within the lumps during the combustion due to decomposition and incomplete combustion of the gas. I prefer therefore and in general find it necessary for the production of a satisfactory product to follow the above described gas period by an air or blast period which constitutes the second phase of the converter operation.

For this purpose at the conclusion of the gas period the gas is turned off and air alone is admitted from the blower for a suitable length of time, for example from two to eight hours or longer, the cover 3 being left on during this stage of the operation. The first part of this blast period is characterized by a distinct rise in temperature and the mass of fragmentary material remains red-hot during substantially all of the blast period. This indicates the evolution of a considerable amount of heat during this period and this I believe to be due to the oxidation of the carbon deposited within the lumps of the material. The heat thus developed is not only very intense but is developed in contact with the material and throughout the entire body thereof and results in a very complete conversion of the magnesia to the form of periclase.

At the end of a suitable period which is determined by experience and by the appearance and behavior of the material in the converter the air blast is discontinued. The material within the converter which now consists substantially of pure periclase is then removed from the converter by tilting the same either with or without allowing the charge to cool before removal. In practice in order to conserve time and immediately make the converter available for a new operation I prefer to tilt the converter and remove the material therefrom immediately after the blast period without allowing it to cool.

While the product thus obtained, which consists of fragments of pure white periclase crystals of minute or microscopic size, may be considered to comprise substantially pure periclase I prefer to subject the same to a further sorting and purifying operation accompanied by a crushing and grinding of the material to any desired state of division. These subsequent operations form no essential part of my invention except inasmuch as they lead to the ultimate production of the converter product in a very pure state and in a marketable form.

For this purpose the material discharged from the converter may be allowed to cool sufficiently to permit handling thereof and is then sorted by hand. Any fragments which are apparently not entirely crystallized or converted to the form of periclase are returned to be mixed with the raw material. Such fragments only occur in general at the extreme top of the converter and at the bottom immediately over the tuyère openings, so that this classification may be easily made. The remainder of the product is then crushed and screened to produce a product of approximately ¼ inch mesh and is then subjected to a magnetic separating operation to remove particles of iron or iron oxide introduced mechanically during the crushing operation. The iron-free material is then subjected to a final grinding operation for example in a pebble mill in which it is ground to any desired grain size for example 60 mesh.

It may be mentioned in this connection that the finely crystalline condition of the periclase produced by the converter operation above described is of very great practical advantage in connection with the grinding of such product to the desired degree of fineness for use. The periclase heretofore produced by fusion of magnesia in an electric furnace has always been in the form of relatively coarse crystals bonded together in a dense stony mass so that reduction of the same to the necessary state of division required not only the breaking up of the hard stony fragments of material but also the breaking up of the individual crystals. A relatively hard grinding was consequently required, accompanied by the production of a large amount of fines or powder of less than the desired size and a repeated or continual separation of the material of the desired fineness or less from the larger material during grinding, thus resulting not only in a non-uniform product but also in a relatively long time and high cost of grinding. In the case of periclase produced by my process on the other hand the crystals are so minute that it is only necessary to grind sufficiently to substantially separate the crystals, or groups of crystals from one another, without requiring appreciable breaking up of individual crystals. Furthermore the crystals are not bonded together in a dense stony mass but are more loosely associated in fragments of a granular nature which are much more easily reduced to the desired size. This grinding is very readily accomplished and the proportion of fines produced is much smaller than in the case of an electric furnace product and little or no removal of the fine material during grinding is necessary, thus resulting in decreased time and cost of grinding as well as greater uniformity in size of the product.

Furthermore the production of periclase without fusion results in the formation of a small amount of magnesium silicate glass and in the uniform distribution of such glass in the form of a thin coating which surrounds or envelopes each individual particle or crystal or a substantial proportion of such particles or crystals, whereas in the coarsely crystalline fused product of the electric furnace, the major portion of the silica apparently goes into solid solution in the magnesia, while any glass which is formed is lumped or unevenly distributed in the product. Since the glass which is formed contains substantially all of the impurities which are present it will be seen that in the converter product such impurities while present in very minute amounts are uniformly distributed over the surface of the crystals, while in the electric furnace product the distribution of such impurities is much less uniform. Furthermore the coating of glass on the individual particles is substantially impervious to moisture and I believe this coating of glass to be an important factor in preventing or inhibiting the absorption of moisture by the periclase produced in accordance with my invention. The low absorption of moisture is of advantage for the reasons above stated.

The resulting product is a dry white powder which is substantially non-hygroscopic and has a very low electrical conductivity. Even after standing for a long period of time in wet weather it does not cake together like the periclase ordinarily produced in the electrical furnace, such caking being due to absorption of water from the air. No difficulty is experienced in practice in maintaining the mosture content of the product well below one tenth of one per cent, and in fact the mosture content is usually not over two or three hundredths of one per cent. The low electrical conductivity of the material renders it very useful for electrical insulation work, the powder being for this purpose packed or tamped in place around the electrical conducting members to be insulated. A particularly advantageous application of this material for electrical insulation is in the insulation of heating coils in which the powdered periclase produced as above described is tightly packed around the heating coil in a suitable container. The fact that this material in addition to being an electrical insulator is a comparatively good heat conductor and is unaffected by heating to a relatively high temperature is also of further advantage in this connection.

Macroscopic and microscopic examination of samples of periclase produced by the electric furnace method and by the converter method above described shows that in the converter product the average grain size is on the order of 1/100 as great as in the electric furnace product. The grain size of the converter product has been found to vary between .010 mm. and .042 mm. with an average size of about .028 mm. and substantially 80% between .017 mm. and .035 mm. In the electric furnace product on the other hand approximately 99% of the crystals are 1 mm. in diameter or larger with only about 1% of approximately .2 mm. and only about .1% of .10 mm. or less. Microscopic examination also shows the presence of a coating of siliceous glass on the major portion of crystals of periclase formed by the converter method and a substantially total absence of such coating of glass in the electric furnace product.

The heating process above referred to by which the magnesia is converted into the form of periclase consists, as stated, of two stages; first, the combustion, in direct contact with the surfaces of the lumps or fragments of magnesia, of an explosive mixture of gas and air whereby the entire mass is raised to a high temperature and finely divided carbon is deposited throughout the lumps or fragments; and second, passing air through and in contact with the surfaces of the resulting hot body of material, causing the deposited carbon to be burned through the material, which in turn causes a further raise in temperature and a substantially complete conversion of the magnesia to the crystalline form of periclase. It is apparent that in the first stage the combustion takes place not only at the surface of the fragments but to some extent at least within the voids inside the fragments themselves, for the deposition of finely divided carbon takes place practically homogenously throughout such fragments. This indicates that the fragments or lumps of which the charge is made up are finely porous and therefore gas-permeable. In the same way the oxidation of this carbon during the air blast period takes place throughout and in intimate contact with substantially the entire mass of material. I have found that a higher temperature can be attained by first burning a mixture slightly deficient in oxygen so as to deposit carbon in the charge and then burning out this carbon with a blast of air than by simple combustion of a perfect mixture of gas and air in and around the charge. Whether the deposition of carbon and its subsequent removal by air blast is of benefit only because of the high temperature thus produced or whether the reaction thus obtained has some catalytic effect in promoting the conversion of the magnesia to the form of periclase, I can not state with certainty, but tests have shown a much more complete conversion when the process is carried out as above described than when the magnesia is heated by any other means known to me, with the possible exception of fusion in the electric furnaces. The production of periclase in the electric furnace on the other hand is subject to the disadvantages above set forth namely the contamination of the product by the impurities inevitably resulting from the electric furnace operation and the relatively coarsely crystalline nature and consequent difficult grinding of the product. By my improved method of production, not only is a much more finely crystalline product obtained, but also the introduction of impurities into the product is entirely eliminated, since the only foreign materials which come in contact with the product during the heating operation are the gas and air and the refractory lining material of the converter. This refractory lining should be substantially free from iron or other impurities which are apt to contaminate the periclase. The refractory lining of the converter may for example advantageously comprise refractory bricks or blocks of magnesium-aluminate. It is to be noted however that any possible contamination which might result from the converter lining even with the use of the purest materials therein would be confined to a comparatively small proportion of the entire converter charge and the portion thus contaminated could easily be separated in the subsequent sorting operation and even if not removed would have no appreciable effect on the composition of the entire mass.

I have not been able to determine with accuracy the exact temperature attained in the converter operation but such measurements as have been made indicate that this temperature is approximately ceramic cone 40 or 3506° F. I do not wish to be limited therefore to any exact temperature but may employ any temperature which may be obtained by the above-described method and which is sufficient under the conditions set forth to cause substantially complete conversion of the magnesia to the form of periclase. It will be noted however that the above temperature is well below the melting point of magnesia which is about 5070° F. and I believe that the production of minute crystals of silica as well as the formation of the extremely thin glass coating on the individual crystals is due to the fact that the magnesia is converted to the form of periclase without fusion. The production of periclase without fusion also results in the formation of a granular product which is relatively easily disintegrated as distinguished from the dense, stony, difficultly ground product produced by fusion in the electric furnace. Furthermore, by this method, the individual fragments or aggregates originally charged into the converter retain substantially their original shape and are not substantially fused together to form a solid mass. The temperature to which the fragmentary body of magnesia is heated may therefore be defined as sufficient to cause substantially complete conversion of the magnesia to crystalline form but insufficient to cause fusion thereof or to cause the fragments of the charge to substantially fuse together.

I claim:

1. A magnesia product consisting of magnesia which has been heated sufficiently to convert the same substantially wholly to periclase without fusion thereof.

2. A magnesia product consisting substantially of fragments composed of magnesia crystals produced by heating fragments of magnesia to a temperature sufficient to convert the magnesia to crystalline form but insufficient to substantially fuse such fragments together.

3. The process of making a magnesia product which comprises heating a body of magnesia by combustion of fuel in contact therewith, the latter portion at least of such heating operation being conducted under oxidizing conditions to convert such magnesia substantially wholly to crystalline form, while maintaining the temperature throughout the heating operation below the fusion point of magnesia.

4. The process of making a magnesia product which comprises forming a body of magnesia in fragmentary condition, burning an explosive mixture of carbon-bearing gas and air in contact with said body of magnesia to heat the same to a high temperature and cause deposition of carbon therein, and then passing air through said body of magnesia to oxidize such deposited carbon and cause the magnesia to be converted to the form of periclase due to the heat developed by such oxidation.

5. The process of making periclase which comprises heating a fragmentary body of magnesia to a substantially uniform temperature which is sufficient to convert the magnesia substantially to the form of periclase but insufficient to substantially fuse together the fragments of such body.

6. A magnesia product consisting substantially of periclase crystals, a substantial proportion of the individual crystals having a thin coating of glass thereon.

7. A magnesia product consisting of a granular non-fused body of crystals.

8. A magnesia product as set forth in claim 7, said crystals having an average diameter of less than one tenth of one millimeter and a substantial proportion of said crystals having a coating of glass surrounding the same.

9. The process of making periclase which comprises the steps of impregnation of a mass of highly heated magnesia with carbon and then oxidizing the deposited free carbon by air blast.

10. The method of producing a magnesia product in the form of periclase which consists in heating a body of magnesia to a high temperature and while maintaining such temperature impregnating the mass with carbon and then rapidly oxidizing the carbon.

11. The method of producing periclase which consists in heating the magnesia by combustion of fuel proportioned to have an excess of carbon for a sufficient period of time to effect a deposit of carbon substantially throughout the mass of magnesia and then producing an increase in temperature by rapid oxidation of the carbon.

12. The method of producing periclase which consists in subjecting magnesia to heat by combustion of air and fuel gas in contact with the same for a substantial period of time to produce high temperature in the mass and effecting a deposit of free carbon in the mass by the gas and then discontinuing the supply of gas and blasting with air to rapidly act upon the uncombusted carbon for continuation of the heating process at higher temperature until conversion to crystalline form.

In testimony whereof I have hereunto subscribed my name this 28 day of March, 1925.

THOMAS S. CURTIS.